Figure 1:
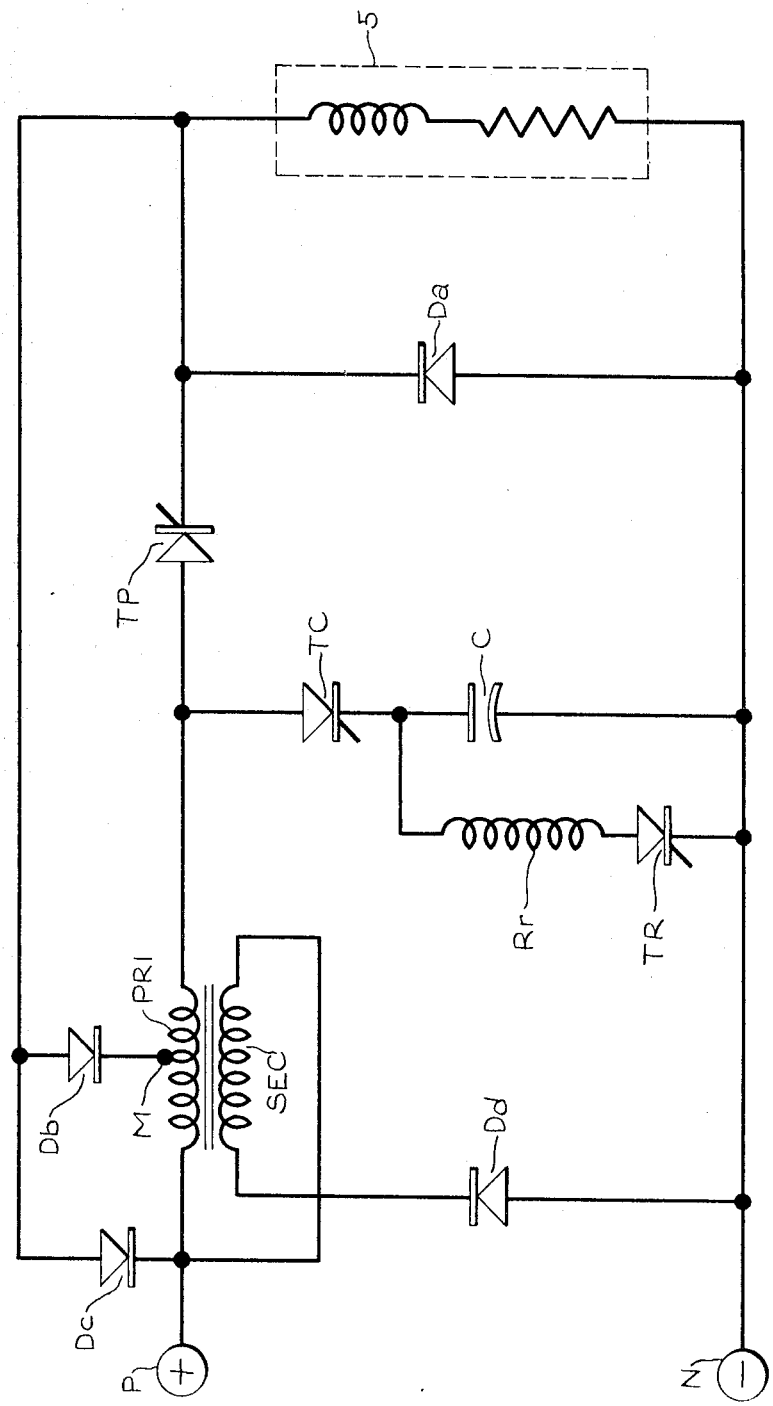

United States Patent

[11] 3,588,667

[72] Inventors David L. Duff
Burlington, Ontario;
Shashi B. Dewan, Toronto, Ontario,
Canada
[21] Appl. No. 876,319
[22] Filed Nov. 13, 1969
[45] Patented June 28, 1971
[73] Assignee Marathon Electric Research of Canada Ltd
Oakville, Ontario, Canada

[54] MEANS FOR CONTROLLING BACK VOLTAGE ACROSS POWER THYRISTORS DURING COMMUTATION THEREOF
6 Claims, 2 Drawing Figs.
[52] U.S. Cl................................................. 321/5,
321/45
[51] Int. Cl....................................................... H02m 7/20,
H02m 7/44
[50] Field of Search............................................ 321/2, 5,
16, 45, 45 (C), 45 (E/R)

[56] References Cited
UNITED STATES PATENTS
| | | | |
|---|---|---|---|
| 3,321,697 | 5/1967 | Etter | 321/45(E/R) |
| 3,388,310 | 6/1968 | Etter | 321/5 |
| 3,388,311 | 6/1968 | De La Lastra | 321/16 |
| 3,460,021 | 8/1969 | Schlabach | 321/5 |
| 3,500,170 | 3/1970 | Charrin et al. | 321/45(C) |

Primary Examiner—James D. Trammell
Assistant Examiner—Gerald Goldberg
Attorney—Ira Milton Jones ABSTRACT: In apparatus comprising a power thyristor for controlling energization of a load from a DC source, a commutating capacitor, a commutating thyristor, and a reactor winding, back voltages across the power thyristor during commutation are limited by a diode connected between the load side of the power thyristor and a medial tap on the reactor winding, arranged to block flow of energizing current between the DC terminals and the load. Another diode, connected between the load side of the power thyristor and a DC terminal, and similarly arranged, feeds regenerative current back to the DC source.

MEANS FOR CONTROLLING BACK VOLTAGE ACROSS POWER THYRISTORS DURING COMMUTATION THEREOF

This invention relates to choppers and inverters by which direct current is converted to pulsed direct current or to alternating current, and the invention pertains more specifically to means in such apparatus, operative during commutation of its power thyristors or other switching devices, to limit back voltages across such switching devices.

In a chopper or an inverter, current from a pair of input terminals connected with a DC source is fed to output terminals under the control of one or more controlled unidirectional switching devices. The switching devices that can be used for this purpose include thermionic devices (thyratrons), and the invention is applicable to choppers and inverters equipped with them; but in the present state of the art, solid-state switching devices are generally preferred, and the invention will therefore be described herein with reference to thyristors, which are also known as silicon controlled rectifiers (SCRs).

Normally a thyristor blocks current flow in both directions between its anode and its cathode. However, when a signal is applied to its gate, it becomes forwardly conductive; and it remains so as long as current continues to flow through it in the forward direction, even though the gate signal is terminated. To switch it off, current flow through the thyristor must be terminated, whereupon it becomes and remains forward blocking until another gate signal is applied to it. For a thyristor to remain switched off, forward current flow through it must be discontinued for a short but definite interval known as the turnoff time. The turnoff time of a thyristor can be substantially reduced by applying a back voltage to it instead of merely terminating forward current flow through it.

Since choppers and inverters are used with inductive loads, or with loads having some inductance, a power thyristor in such apparatus is switched off by diverting current from the circuit that contains the power thyristor and its load, into a commutating circuit connected in shunt across the thyristor and the load. The commutating circuit comprises, in series, a commutating thyristor and a capacitor having a predetermined charge. When the power thyristor is to be commutated (i.e., switched off), the commutating thyristor is switched on, and the current that had been flowing through the power thyristor then flows to the capacitor through the commutating thyristor.

For such current diversion to be effective in switching off the power thyristor, it should result in the potential difference across the power thyristor being changed from a forward voltage to a back voltage. To insure that the necessary potential change will occur at the capacitor side of the power thyristor, both the power and the commutating thyristors are connected with the DC source through a reactor which isolates the DC supply from the power thyristor and the commutating means.

It will be seen that during commutation the back voltage across the power thyristor always reaches a value which is at least approximately equal to the charge on the condenser. With some types of loads, under certain conditions, the back voltage across the power thyristor tends to exceed that value by a very substantial amount. When the power thyristor is forwardly blocking, however, the voltage across it normally does not greatly exceed the voltage across the DC source terminals, although it can at times tend to exceed it to some extent. However, the back voltages impressed across a power thyristor in a chopper or an inverter are of primary concern, inasmuch as the back voltage rating of a given thyristor is equal to its forward voltage rating, and the charge on the commutating capacitor at the beginning of commutation is equal to about twice the voltage across the DC input terminals. In view of these relationships, the back voltage impressed across a power thyristor during commutation tends to impose limitations upon a chopper or inverter of which the thyristor is component, which limitations are stated in terms of the characteristics of a regenerative load that can be energized through the apparatus.

A known expedient for accommodating excessive back voltages is to connect two (or more) thyristors in series, so that they share the voltage. But thyristors are relatively expensive, and therefore duplicating them is not economically practical. It is an especially costly expedient for improving the voltage rating of a three-phase inverter, wherein there are six power thyristors to be thus duplicated.

With the foregoing considerations in mind, it is a general object of this invention to provide, in a chopper or inverter having a unidirectional switching device that controls flow of energizing current from a DC source to a load, simple and inexpensive means for controlling the maximum back voltage impressed across the switching device during commutation thereof.

Another object of this invention is to provide a chopper or inverter having DC input terminals and a power thyristor or thyristors connected with its output terminals, and having means for preventing back voltages across the power thyristor or thyristors during commutation thereof from exceeding a value substantially equal to the voltage across the commutating capacitor, and whereby regenerative current from apparatus connected with the output terminals can be fed back to the input terminals for efficient energy recovery.

Another object of this invention is to provide simple, inexpensive and efficient means for limiting the back voltages impressed across the power thyristors of a chopper or inverter during power thyristor commutation, so that the voltage rating of the apparatus can be substantially increased relative to a comparable prior apparatus incorporating the same power thyristors.

With these observations and objectives in mind, the manner in which the invention achieves its purpose will be appreciated from the following description and the accompanying drawings which exemplify the invention.

Figure 2:
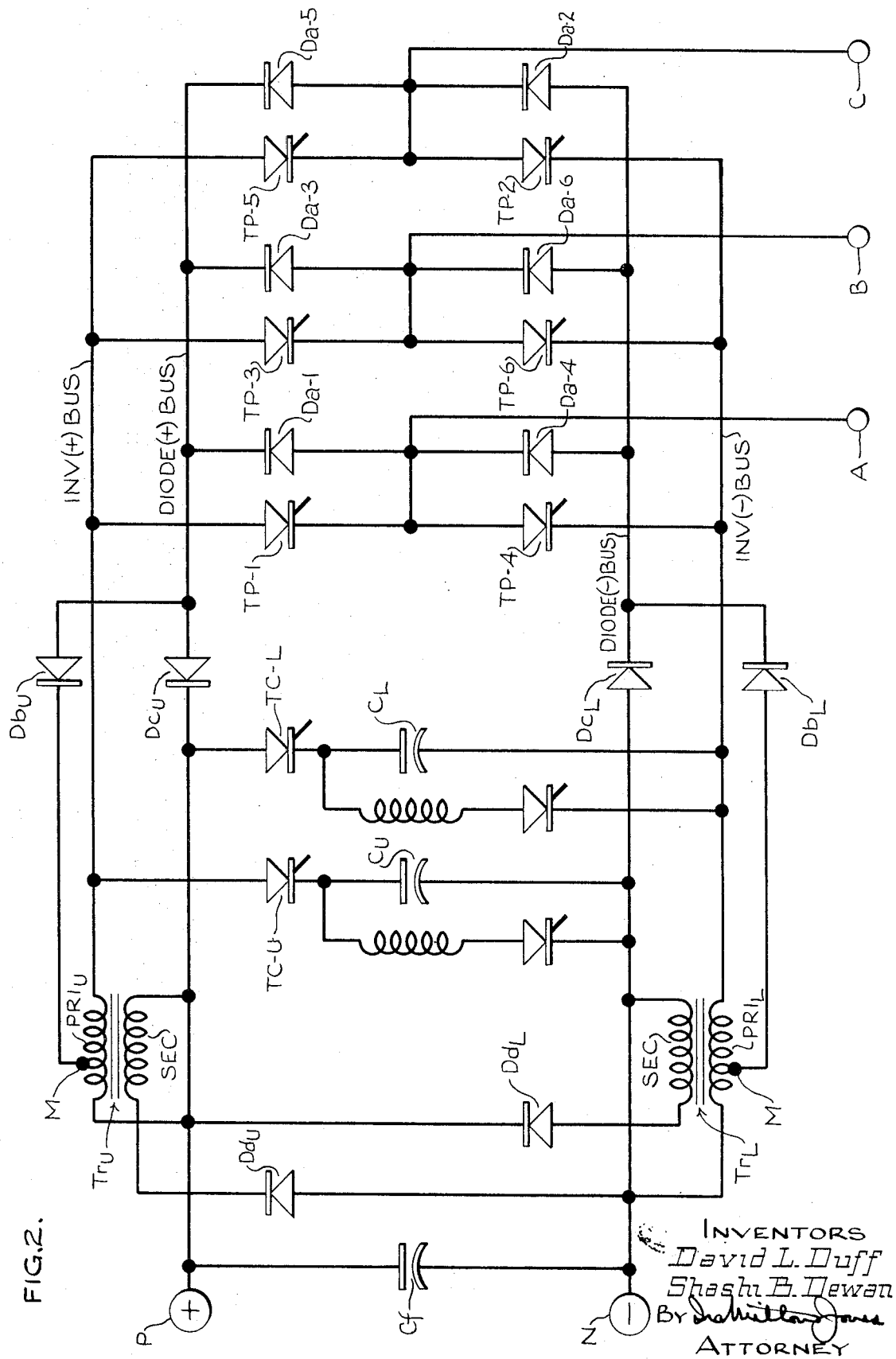

The accompanying drawings illustrate two complete examples of embodiments of the invention constructed according to the best modes so far devised for the practical application of the principles thereof, and in which:

FIG. 1 is a circuit diagram of a chopper embodying the principles of this invention; and FIG. 2 is a circuit diagram of a three-phase inverter that embodies the invention.

Referring now to the accompanying drawings, apparatus embodying the present invention is employed to control flow of current between a pair of input terminals P and N, which are connectable with a DC source, and a load 5 that is shown as having both resistance and inductance. A chopper such as is illustrated in FIG. 1 provides for a pulsed or intermittent flow of current to the load in accordance with a schedule determined by a control device connected with the apparatus. The control device, which can be of a known type, is not shown.

The specific element of the apparatus that controls current flow between the DC terminals P and N and the load 5 is a unidirectional switching device TP, which is illustrated as a thyristor. Its anode and cathode are connected in a series circuit with the load and the DC terminals, and its gate is connected with the control device. The power thyristor TP is switched on by a signal issued to its gate-cathode circuit from the control device, in accordance with well known principles.

For switching off the power thyristor there is a commutating means connected in shunt across the power thyristor and the load, comprising, in series, a capacitor C and a commutating thyristor TC. Initially the capacitor C has a charge such that the potential at the cathode of the commutating thyristor TC is negative with respect to terminal N by a predetermined voltage value. When the power thyristor TP is to be switched off, the control device issues a signal to the gate of the commutating thyristor TC, switching it on; and as current flows through the commutating thyristor to the capacitor, the potential at the anode of power thyristor TP drops to nearly the potential of the cathode of commutating thyristor TC, thus impressing across the power thyristor a back voltage that turns it off.

To isolate the power thyristor and the commutating means from the DC supply during commutation, there is a reactor winding PRI that has one of its ends connected with the DC input terminal P and has at its other end a common connection with the power thyristor and the commutating thyristor. As shown, the reactor winding PRI comprises the primary of an energy recovery transformer Tr, the purpose of which is explained hereinafter. When the commutating thyristor TC is switched on, the reactor PRI supports a voltage substantially equal to the charge on the capacitor plus the voltage across the DC terminals, thus insuring the desired abrupt drop in potential at the anode of the power thyristor TP.

The current flowing to the capacitor during commutation charges it to a polarity opposite to that which it initially had. The period of commutation terminates when the capacitor tries to force current back through the commutating thyristor TC, whereupon that thyristor is switched off.

At the end of the period of commutation the charge on capacitor C is of the opposite sign from that which it initially carried, which is to say that the charge on the capacitor is the reverse of that required for the next commutation of the power thyristor TP. Various expedients are available for accommodating this situation, but the one that is preferred, and which is here illustrated, is that disclosed and claimed in our copending application Ser. No. 876,320, filed Nov. 13, 1969. It comprises recycling means shunted across the capacitor, comprising, in series, a recycling reactance Rr and a recycling thyristor TR. At a time after commutating thyristor TC is switched off, and before the next commutation of power thyristor TP must be performed, a gate signal is applied to recycling thyristor TR by the control device. With thyristor TR conducting, capacitor C and recycling reactance Rr are connected in a resonant circuit by which the capacitor is recharged back to its original potential. The capacitor is of course prevented from losing this new charge of its original potential because the recycling thyristor TR is turned off by the back voltage that appears across it as soon as the capacitor attempts to discharge.

When the power thyristor TP is commutated, there would be a tendency for forward current to continue to flow through it, due to the inductance of the load 5; but this is prevented by a so-called freewheeling diode Da which is shunted across the load and which provides an alternate path for such regenerative current around a loop comprising said diode and the load. Note that the diode Da is arranged to prevent flow of current in the direction from the positive DC terminal to the negative one, and therefore it conducts only for an interval beginning with switching on of the commutating thyristor TC. It serves to prevent the potential of the cathode of power thyristor TP from falling to a value which is negative relative to the potential of the negative DC terminal N.

Under certain load conditions, with the power thyristor TP conducting, the potential at its cathode tends to rise above the potential at the positive DC terminal. To prevent this, the chopper embodying this invention has a regenerative current circuit that comprises a diode Dc which is connected between the cathode of the power thyristor TP and the positive input terminal P and which is arranged to pass only regenerative current, that is, current which tends to flow in the circuit comprising the load 5 and the freewheeling diode Da. Thus the diode Dc blocks flow of energizing current between the DC input terminals and the load and hence prevents the load from being energized from the DC source through the regenerative circuit at times when the power thyristor TP is not conducting.

In effect, the diode Dc provides for energy recovery in feeding regenerative current from the load back to the DC source, and concomitantly clamps the potential at the cathode of the power thyristor to that of the positive DC terminal.

With prior apparatus of the type described to this point, operating under certain load conditions, the back voltage across the power thyristor TP during commutation could reach a value substantially higher than the voltage across the capacitor at the initiation of commutation. But the present invention provides means to prevent this, comprising a medial tap M on the reactor winding PRI to which the cathode of power thyristor TP is connected through a diode Db. The diode Db, like the diode Dc, is arranged to pass only regenerative current, blocking flow of energizing current between the DC input terminals and the load. It will be noted that the diodes Db and Dc have a common connection with one another and with the circuit comprising the load 5 and the freewheeling diode Da.

If, due to load conditions, the back voltage across the power thyristor TP during commutation should tend to exceed a value substantially equal to the charge on the commutating capacitor C, diode Db is forwardly biased, and current flows through it, through a portion of the reactor winding, and through the commutating thyristor TC, to the commutating capacitor. In effect, therefore, a clamping function is performed by the diode Db in cooperation with the portion of the reactor winding that is in series with it and the commutating capacitor whereby the back voltage across the power thyristor TP is limited to a value substantially equal to the charge on the capacitor C.

When the diode Db is conducting, the potential at its connection with the cathode of the power thyristor TP will of course be substantially lower than that at the positive input terminal P. However, the diode Dc, being then reverse biased, blocks flow of current from input terminal P to the power thyristor cathode, and thus insures that the circuit comprising diode Db will perform its function of limiting back voltage across the power thyristor.

To cause the diode Db to be forwardly biased whenever the maximum desired back voltage across the power thyristor obtains, the location of the medial tap M on the reactor winding PRI must be appropriately chosen. Bearing in mind that the voltage supported by the reactor winding during commutation is the sum of capacitor charge voltage plus DC source voltage, the location of the tap M should be so chosen that the portion of the winding that is in series with the diodes Db and the capacitor C is that which can be regarded as supporting the capacitor charge. Stated another way, the portion of the winding between the tap M and the positive DC terminal bears substantially the same ratio to the other portion of the reactor winding as the voltage across the DC source terminals bears to the charge normally on the capacitor at the instant when the commutating thyristor TC is switched on. Thus if the voltage across the DC terminals is 100 volts, and the normal charge on capacitor C for commutation is 200 volts, the tap M will be at a location corresponding to one-third of the distance from the left-hand end of the winding.

As mentioned above, the reactor PRI comprises the primary winding of an energy recovery transformer Tr which also has a secondary SEC that is closely coupled with the primary. In the absence of the secondary the reactor PRI and the capacitor C in series with it would comprise a resonant circuit having a low resistance, and the reactor would, in effect, try to charge the capacitor to a reverse potential of a value substantially higher than the value of the original charge upon it. Various means are known for preventing such so-called overshooting, or for compensating for overshooting after it has occurred, and any such known expedients can be employed in association with the present invention. The one that is preferred, for reasons of efficiency, is the one just mentioned, that is, the provision of a secondary winding SEC that is closely coupled with the reactor PRI so that the two windings together comprise the energy recovery transformer Tr.

The secondary SEC, in series with a diode Dd, is connected across the DC terminals. The diode Dd is so arranged as to block flow of current from the positive to the negative terminal. During commutation, as the charge on the capacitor reaches the desired potential, the current through the primary winding or reactor PRI decreases rapidly, and this decreasing current through the primary induces a current in the secondary SEC which flows in the direction to forwardly bias the diode Dd and, through it, flows back to the input terminals. The turns ratio of the windings PRI and SEC is so chosen that the diode Dd is forwardly biased when the capacitor has been charged to the desired potential. Such current flow through the secondary brings about a rapid termination of current flow through the primary PRI and to the condenser, and at the same time effects return of energy to the supply circuit that would otherwise be expended in overcharging the capacitor.

Note that there is no interference between the functioning of the secondary SEC of the energy recovery transformer Tr and the functioning of the regenerative current circuits comprising the diodes Db and Dc.

Load conditions that would forwardly bias either the diode Db or the diode Dc are not a common occurrence with chopper apparatus, although such conditions can be experienced. With an inverter, however, comparable regenerative load conditions can very readily occur, as when the load connected with the output terminals of the inverter is an AC motor that may at times be driven by an inertia load. Thus the present invention, while by no means limited to inverters in its utility, is of particular value in an inverter like that illustrated in FIG. 2, which can be used for energizing a three-phase induction motor from a source of DC that is connected with input terminals P and N. The motor or other load is connected with three-phase output terminals A, B and C.

Each of the input terminals P and N is connected through a reactor $PRI_U$ and $PRI_L$, respectively, with a corresponding inverter bus INV(+)BUS and INV(−)BUS, respectively. Each reactor $PRI_U$, $PRI_L$ comprises the primary of an energy recovery transformer $Tr_U$ and $Tr_L$, respectively. A capacitor Cf connected across the DC terminals serves as a ripple filter.

Each of the output terminals A, B and C is connected with each of the inverter buses through a power thyristor. Thus terminal A is connected with INV(+)BUS through thyristor TP–1 and with INV(−)BUS through thyristor TP–4. Similarly, terminals B and C are respectively connected with INV(+)BUS through thyristors TP–3 and TP–5 and with INV(−)BUS through thyristors TP–6 and TP–2. The thyristors TP–1, TP–3 and TP–5 that are connected with the positive inverter bus are herein referred to as the upper power thyristors, while the remaining power thyristors are designated the lower ones.

The upper power thyristors are all commutated at the same time, but independently of commutation of the lower ones, by commutating means comprising a commutating thyristor TC–U in series with a capacitor $C_U$; while the lower power thyristors are commutated simultaneously with one another by a similar commutating means comprising commutating thyristor TC–L in series with a capacitor $C_l$.

Note that the commutating means for the upper power thyristors TP–1, TP–3 and TP–5, comprising commutating thyristor TC–U and capacitor $C_U$, is connected between the positive inverter bus and the negative DC terminal, while the commutating means for the lower power thyristors, comprising commutating thyristor TC–L and capacitor $C_L$, is connected between the negative inverter bus and the positive DC terminal.

As with the chopper of FIG. 1, each of the commutating capacitors $C_U$ and $C_L$ of the FIG. 2 inverter is recharged to its original potential after each commutation. The recycling means for commutating capacitor $C_U$ comprises a recycling thyristor $TR_U$ in series with a reactor $Rr_U$, the series-connected thyristors and reactor being shunted across the capacitor $C_U$. The recycling means for capacitor $C_L$ comprises a thyristor $TR_L$ and a reactor $Rr_L$ similarly arranged.

It will be understood that suitable control apparatus (not shown) applies firing signals to the several thyristors at the proper times to cause the load connected with the output terminals to be energized with three-phase AC of the desired frequency.

As with the chopper, the energy recovery transformers of the inverter have secondary windings SEC which prevent charging of the commutating capacitors to an excessive potential and which return to the DC supply energy that would otherwise be applied to overcharging those capacitors. The secondary of each transformer $Tr_U$ and $Tr_L$ has a connection to the input terminal to which its primary is connected, and is also connected, in series with a diode $Dd_U$, $Dd_L$, with the DC terminal of opposite polarity. Each of the diodes $Dd_U$ and $Dd_L$ is arranged to prevent flow of current from the positive terminal to the negative one.

In the case of the inverter illustrated in FIG. 2, regenerative energy from the load is fed back to the DC input under some load conditions, and under other load conditions it is recirculated back through the load circuit as in the freewheeling arrangement of the FIG. 1 chopper. The circuit means for accomplishing this comprises a pair of diodes for each of the output terminals A, B and C, and a pair of diode buses DIODE(+)BUS and DIODE(−)BUS. Specifically upper diodes Da–1, Da–3 and Da–5 are respectively connected between output terminals A, B and C and DIODE(+)BUS, while lower diodes Da–4, Da–6 and Da–2 are connected between those respective output terminals and DIODE(−)BUS.

Each diode bus is common to a pair of regenerative current circuits. In the case of the upper diode bus DIODE(+)BUS the two regenerative circuits comprise a diode $Dc_U$ connected between that bus and the positive DC input terminal and a diode $Db_U$ connected between that bus and a medial tap M on the reactor winding $PRI_U$. Similarly, a diode $Dc_L$ is connected between the lower diode bus DIODE(−)BUS and the negative input terminal N, and another diode $Db_L$ is connected between that bus and a medial tap M on the reactor winding $PRI_L$.

Each of the diodes $Db_U$, $Dc_U$, $Db_L$ and $Dc_L$ is arranged to pass only regenerative current and to block flow of energizing current between the input terminals and the load. It will be seen that the diodes $Db_U$ and $Dc_U$ provide alternative regenerative current circuits, while the diodes $Db_L$ and $Dc_L$ provide another pair of alternative regenerative current circuits.

The operation of the inverter apparatus shown in FIG. 2 is generally similar to that of the FIG. 1 chopper, bearing in mind that the upper power thyristors are commutated by commutating thyristor TC–U and commutating capacitor $C_U$, while the lower power thyristors are commutated by TC–L and $C_L$.

The functioning of the diodes comprising the regenerative current circuits is likewise generally similar to that of their counterparts in the chopper embodiment of the invention illustrated in FIG. 1.

Thus, for example, if only upper power thyristors TP–1 and TP–3 are conducting, then, under some load conditions, the potential at the cathode of power thyristor TP–5 tends to exceed that at the positive DC terminal P. When this happens, the diodes Da–5 and $Dc_U$ are both forwardly biased, and current flows through them from the cathode of power thyristor TP–5 to the DC input terminal P. The diode $Dc_U$ thus cooperates with the upper inverter diodes Da–1, Da–3 and Da–5 to clamp the potential at the cathodes of the upper power thyristors to that of the positive input terminal P (plus negligible voltage drops across the diodes) and to feed regenerative energy from the load back to the DC source. Similarly, the diode $Dc_L$ cooperates with the lower inverter diodes Da–4, Da–6 and Da–2 to clamp the potential at the anodes of the lower power thyristors to that of the negative DC terminal N.

Assume now that upper power thyristors TP–1 and TP–3 are conducting, that upper inverter diode Da–5 is also conducting, and that the upper power thyristors are to be commutated. In the absence of the diodes $Dc_u$ and $Db_U$, upon commutation there would be a back voltage across the power thyristor TP–5 that would be substantially equal to the voltage supported by the reactor $PRI_U$ (i.e., the sum of the capacitor charge voltage plus the voltage across the DC terminals), inasmuch as the potential at the cathode of TP–5 would remain substantially equal to that at the positive input terminal P while the potential at its anode dropped to a value negative to the negative input terminal by the amount of the charge on the capacitor. Under these circumstances, however, the diode $Db$ is forwardly biased, as is the diode $Da$-5, and current flows from the cathode of power thyristor TP-5, through diodes $Da$-5 and $Db_U$, through a portion of the reactor winding (the right-hand portion, as shown) and to the commutating capacitor $C_U$, thus, in effect, clamping the back voltage across the upper power thyristors to a value which cannot exceed the charge on the commutating capacitor.

As indicated above, the portion of the reactor winding $PRI_U$ that it is in series with the diode $Db_U$ and the commutating capacitor $C_U$ determines the back voltage that will be impressed across the upper power thyristors during commutation of them, and is preferably so chosen as to correspond to that portion of the voltage drop across the whole winding during commutation which is attributable to the capacitor charge voltage. The same relationship of course obtains with respect to the medial tap M on the lower reactor winding $PRI_L$.

The lower regenerative current circuit diodes $Db_L$ and $Dc_L$ function in a manner generally similar to their upper counterparts, bearing in mind the difference in sign and consequently of direction of current flow. Thus, if the back voltage across one of the lower power thyristors during commutation should exceed the value of the charge on the lower commutating capacitor $C_L$, diode $Db_L$ will be forwardly biased and current will flow from the capacitor $C_L$, through a portion of the reactor winding $PRI_L$, through the diode $Db_L$, and through the appropriate one of the lower inverter diodes $Da$-4, $Da$-6, $Da$-2, to the anode of the lower power thyristor across which such excessive back voltage tended to be manifested. Diode $Dc_L$ will of course prevent flow of current from the regenerative current circuit comprising the diode $Db_L$ back to the negative input terminal N.

From the foregoing description taken with the accompanying drawings it will be apparent to those skilled in the art that this invention provides simple and inexpensive means for limiting back voltages across the power thyristors (or other unidirectional controlled switching devices) of choppers and inverters during commutation of such switching devices, and also provides means for returning regenerative current to a DC source connected with a chopper or inverter embodying the invention, for recovery of regenerative energy from a load energized through the chopper or inverter.

Those skilled in the art will appreciate that the invention can be embodied in forms other than as herein disclosed for purposes of illustration.

The invention is defined by the following claims:

We claim:

1. Apparatus comprising a first unidirectional switching device connected at one side with a load to control flow of energizing current from a pair of DC terminals through the load, commutating means connected with the other side of the first switching device and comprising, in series, a capacitor to which current can be diverted from the first switching device when the same is to be switched off and a second unidirectional switching device which can be switched on for such current diversion, a reactor winding having one end connected with one of said DC terminals and its other end connected with the first switching device and the commutation means, and means connected with the load side of the first switching device defining a load current circuit wherein regenerative current can flow when the first switching device is switched off, said apparatus being characterized by:
    means for limiting the maximum back voltage impressed across the first switching device during commutation thereof, the last mentioned means comprising:
    A. means providing a tap connection with a medial point on the reactor winding; and
    B. a diode connected between said load current circuit means and said tap connection, said diode being arranged to block flow of energizing current between the load and the DC terminals but to pass current in the direction to flow between the load current circuit means and the capacitor through a portion of the reactor winding.

2. The apparatus of claim 1 further characterized by:
    said medial point on the reactor winding being so chosen that the portion of the reactor winding between it and the first mentioned end thereof bears substantially the same ratio to the other portion of the reactor winding as the voltage across the DC source terminals bears to the charge normally on the condenser when the second switching device is switched on.

3. The apparatus of claim 1 further characterized by:
    a second diode connected between said load current circuit means and said one DC terminal, said second diode being arranged to block flow of energizing current between the load and the DC terminals but to permit regenerative current to flow back to a DC source connected with said terminals when the voltage across the load exceeds that across the DC source terminals.

4. Apparatus of the type comprising a first unidirectional switching device connected with one of a set of load terminals to control flow of load energizing current between said load terminals and DC source terminals, commutating means connected in shunt across the first switching device and the load terminals and comprising, in series, a capacitor to which current can be diverted from the first switching device when the same is to be switched off and a second unidirectional switching device which can be switched on for such current diversion, and a reactor winding having one of its ends connected with one DC source terminal and having a connection at its other end with both said first switching device and said commutating means, said apparatus being characterized by:
    A. the reactor winding having a medial tap;
    B. means comprising a first diode providing a unidirectional conductor connected between one of the load terminals and said medial tap and along which regenerative current can flow between said load terminal and the capacitor, through a portion of the reactor, whenever, during commutation, back voltage across the first switching device exceeds a predetermined value, said first diode being arranged to prevent energizing current from flowing along the first unidirectional conductor between the DC terminals and the load terminals; and
    C. means comprising a second diode providing a second unidirectional conductor connected between said load terminal and said one DC source terminal, through which regenerative current can flow between the load terminals and the DC source terminals when voltage across the load terminals exceeds that across the DC source terminals, said second diode being arranged to prevent flow of current between said DC source terminal and the medial tap.

5. Apparatus of the type comprising a first unidirectional switching device for controlling flow of energizing current between a pair of DC source terminals and a set of load terminals, said switching device being connected at one side with one of said load terminals, commutating means connected with the other side of the first unidirectional switching device and comprising, in series, a capacitor and a second unidirectional switching device, and a reactor winding having one end connected with one of said DC source terminals and its other end connected with both said other side of the first switching device and the commutating means, said apparatus being characterized by:
    A. the reactor winding having a medial tap; and
    B. means comprising a diode connected between said medial tap and said one load terminal to provide for flow of regenerative current, during commutation, between said load terminal and the capacitor through a portion of the reactor winding, thereby preventing back voltage across the first switching device from exceeding a value that depends upon the charge on the condenser and the location of the medial tap along the reactor winding, said diode being arranged to prevent flow of energizing current between the DC terminals and said load terminal at times when the first switching device is switched off.

6. The apparatus of claim 5, further characterized by:

means comprising a second diode connected between said one load terminal and said one DC terminal and arranged to prevent flow of energizing current between said DC terminal and both said load terminal and said medial tap, said second diode permitting regenerative current to flow between the load and the DC terminals at times when voltage across the load terminals exceeds that across the DC source terminals.